(12) United States Patent
Hsu

(10) Patent No.: US 9,788,616 B1
(45) Date of Patent: Oct. 17, 2017

(54) UMBRELLA TIP STRUCTURE FOR VERTICAL PLACEMENT OF UMBRELLA

(71) Applicant: Dongguan Weikuan Plastic Products Co., Ltd., Dongguan (CN)

(72) Inventor: Ta-Wei Hsu, Dongguan (CN)

(73) Assignee: DONGGUAN WEIKUAN PLASTIC PRODUCTS CO., LTD., Dongguan, Guangdong (CN)

( * ) Notice: Subject to any disclaimer, the term of this patent is extended or adjusted under 35 U.S.C. 154(b) by 0 days.

(21) Appl. No.: 15/340,998

(22) Filed: Nov. 2, 2016

(30) Foreign Application Priority Data

Apr. 14, 2016 (CN) .......................... 2016 1 0229520

(51) Int. Cl.
| | |
|---|---|
| *A47B 91/00* | (2006.01) |
| *A45B 25/00* | (2006.01) |
| *A45B 23/00* | (2006.01) |
| *F16M 13/02* | (2006.01) |

(52) U.S. Cl.
CPC .............. *A45B 25/00* (2013.01); *A45B 23/00* (2013.01); *F16M 13/02* (2013.01); *A45B 2023/0012* (2013.01); *A45B 2025/003* (2013.01); *A45B 2200/00* (2013.01); *A45B 2200/1063* (2013.01)

(58) Field of Classification Search
CPC ................................ A45B 25/22; A45B 25/00
See application file for complete search history.

(56) References Cited

U.S. PATENT DOCUMENTS

| | | | | | |
|---|---|---|---|---|---|
| 2,668,682 | A | * | 2/1954 | Dalton .................... | F16M 11/34 182/109 |
| 6,007,032 | A | * | 12/1999 | Kuo ....................... | F16M 11/10 248/125.1 |
| 9,675,146 | B1 | * | 6/2017 | Howell ................... | A45B 25/00 |

\* cited by examiner

*Primary Examiner* — Amy Sterling
(74) *Attorney, Agent, or Firm* — Leong C. Lei

(57) ABSTRACT

An umbrella tip structure for vertical placement of an umbrella is disclosed, including a fixed pillar, a movable barrel, a spring, and at least two tip blades. The umbrella tip structure is mountable to an umbrella in such a way that tip blades can be automatically expanded and/or collapsed so that in use, with a movable barrel positioned against a horizontal surface, the tip blades may be opened automatically to make the umbrella tip structure a stable and firm support stand that stably and firmly supports the umbrella in a vertical, upright condition on a horizontal surface, achieving vertical placement of the umbrella. The operation and use of the umbrella tip structure is simple and easy.

10 Claims, 6 Drawing Sheets

UMBRELLA TIP STRUCTURE FOR VERTICAL PLACEMENT OF UMBRELLA

TECHNICAL FIELD OF THE INVENTION

The present invention relates to the field of umbrellas, and more particularly to an umbrella tip structure that allows an umbrella to be placed in a vertical, upright condition.

DESCRIPTION OF THE PRIOR ART

An umbrella is a tool for sun shading or for shielding rain and snow. The umbrella is generally made of oil paper, oil cloth, or plastic sheet. The word "umbrella" is a derivative from the Latin word "umbre", which means light shading or shadow. The modern umbrellas often have an umbrella tip or cap.

The tip or cap of the known umbrellas is generally of an integrally formed tip structure, which does not allow an umbrella to be supported in a vertical, upright condition on a horizontal surface. To place an umbrella in a vertical, upright condition, an umbrella holder must be provided so that the umbrella can be placed vertical by being supported by and held in the holder. This causes inconvenience of use for the umbrella users.

SUMMARY OF THE INVENTION

In view of the above, the present invention is made in view of the drawbacks and shortcomings of the prior art and the primary purpose is to provide an umbrella tip structure that allows for vertical placement of an umbrella in order to effectively overcome the inconvenience of use of an umbrella that the umbrella tip of the conventional umbrellas cannot support the umbrellas vertically on a horizontal surface.

To achieve the above purpose, a technical solution adopted in the present invention is as follows.

An umbrella tip structure is provided for vertical placement of an umbrella and comprises a fixed pillar, a movable barrel, a spring, and at least two tip blades, wherein the movable barrel is mounted to a lower end of the fixed pillar in a manner of being movable up and down; the spring has two ends respectively supported on the fixed pillar and the movable barrel such that the spring biases and urges the movable barrel to move downward for position returning; the at least two tip blades are arranged and distributed in an outer circumference of the fixed pillar and each of the tip blades has an upper end that is pivotally connected to a side surface of an upper end of the fixed pillar; each of the tip blades is provided with a link bar and each of the link bars has an upper end pivotally connected to the respective tip blade and each of the link bars has a lower end that is pivotally connected to a side surface of an upper end of the movable barrel; wherein in a closed condition, the at least two tip blades cover and enclose the fixed pillar and the movable barrel with a lower end of the movable barrel projecting beyond and outside lower ends of the tip blades; and in an open condition, the movable barrel moves upward to an extreme position where the tip blades expand outwards with respect to each other.

As an optional embodiment, the side surface of the upper end of the fixed pillar comprises first hinge sections projecting outward therefrom and the upper ends of the tip blades are each provided with a second hinge section extended therefrom, the second hinge sections being pivotally connected to the first hinge sections respectively by means of first pivot pins.

As an optional embodiment, the link bars are each provided with a rotation axle extending from the upper end thereof, and the rotation axle is mounted, by means of a constraint member, to an inside surface of the respective tip blade.

As an optional embodiment, the constraint member is fixed to the inside surface of the tip blade by means of screws.

As an optional embodiment, the link bars are each provided, on the lower end thereof, with a third hinge section, and the movable barrel is provided, on the side surface of the upper end thereof, with fourth hinge sections, such that the fourth hinge sections are each pivotally connected, by means of a second pivot pin, to the third hinge sections respectively.

As an optional embodiment, the at least two tip blades comprise three tip blades distributed in a uniform manner.

As an optional embodiment, the spring is fit over and encompasses an outer circumferential surface of the lower end of the fixed pillar.

As an optional embodiment, the fixed pillar is provided with a holding mechanism fixed to the upper end thereof, the holding mechanism comprising a housing, the housing having an upper end in which a through hole is formed and in communication with an interior space of the housing, the housing being provided, in the interior space thereof, with at least two holding pieces, such that the at least two holding pieces define therebetween a holding hole for clamping an umbrella tip, the holding hole being in alignment with the through hole, each of the holding pieces being provided with an position-returning piece, the position-returning piece being arranged and positioned between the holding piece and the interior of the housing.

As an optional embodiment, each of the holding pieces has an outside surface that is provided with a flexible plastic part attached thereto and the flexible plastic part is located in the holding hole.

As an optional embodiment, the at least two holding pieces comprise three holding pieces.

Compared to the prior art, the present invention exhibits obvious advantages and beneficial effectiveness. Specifically, it can be learned from the above-described technical solution the following facts:

The present invention is mountable to an umbrella in such a way that the tip blades can be automatically expanded and/or collapsed so that in use, with the movable barrel positioned against a horizontal surface, the tip blades may be opened automatically to make the present invention a stable and firm support stand that stably and finely supports the umbrella in a vertical, upright condition on a horizontal surface, achieving vertical placement of the umbrella. The operation and use of the present invention is simple and easy.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
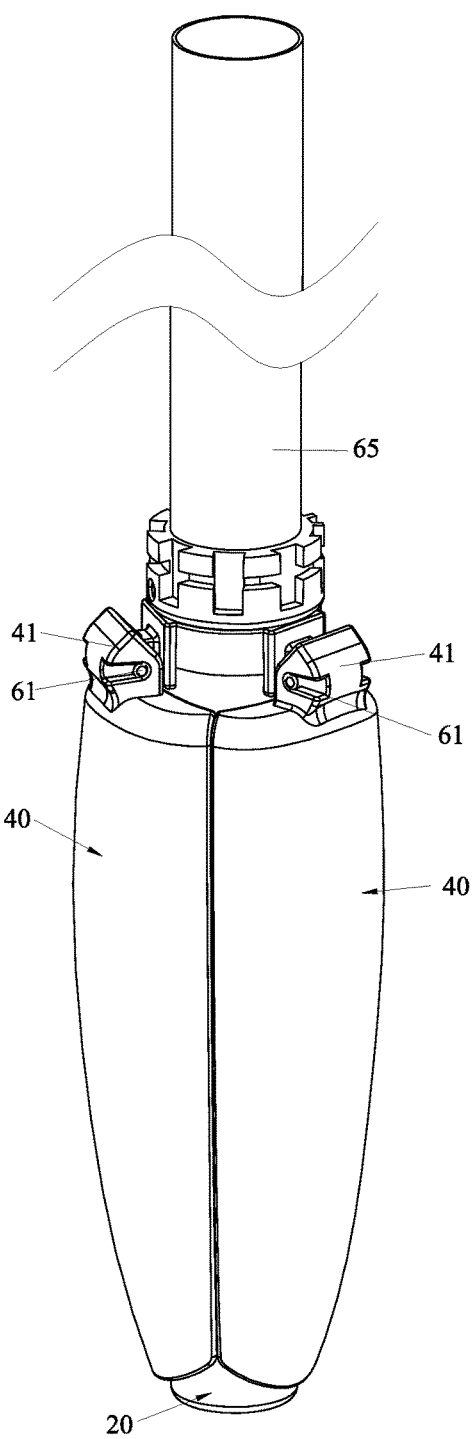
FIG. 1 is a perspective view illustrating a first preferred embodiment of the present invention in an assembled form.
Figure 2:
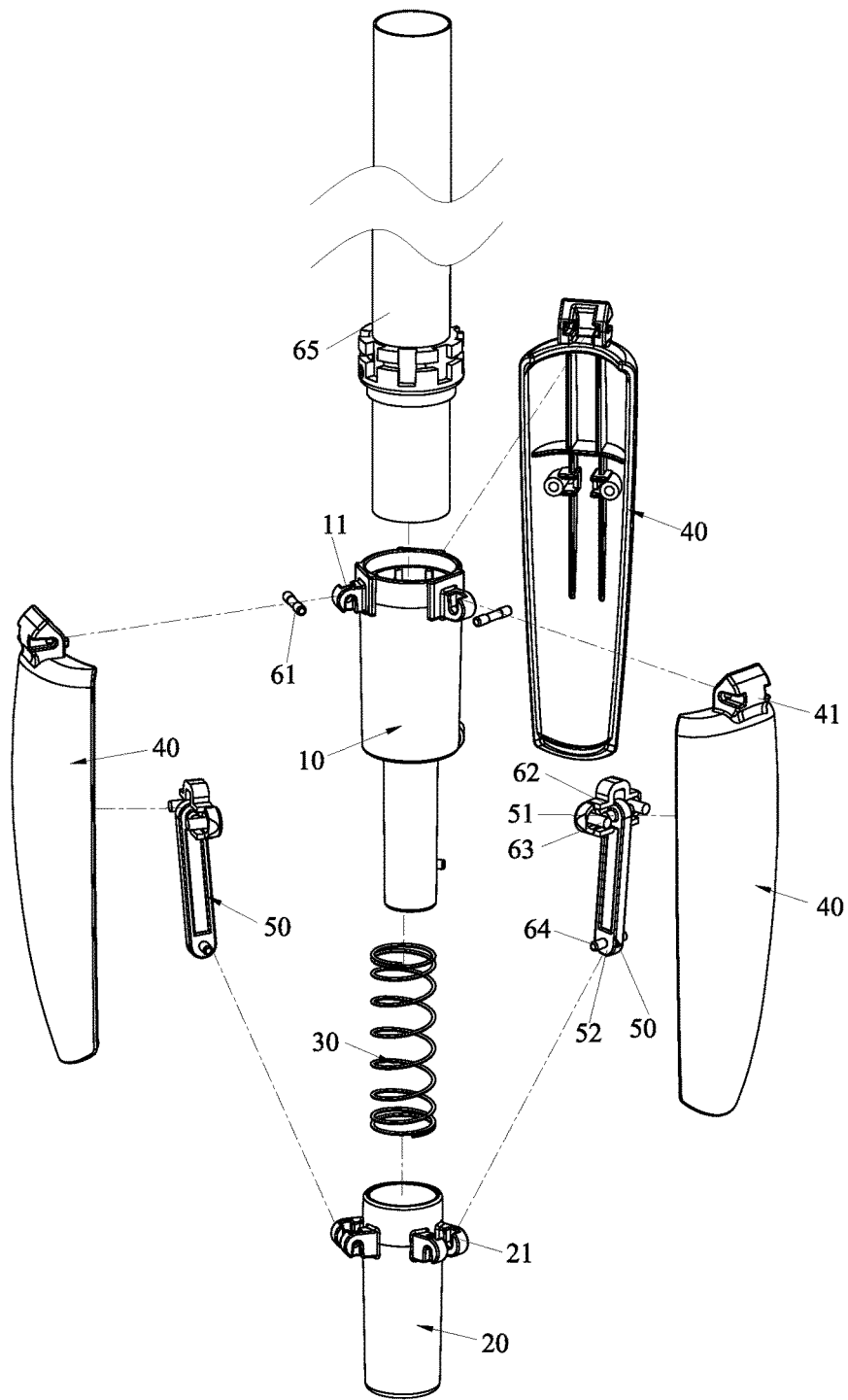
FIG. 2 is an exploded view of the first preferred embodiment of the present invention.
Figure 3:
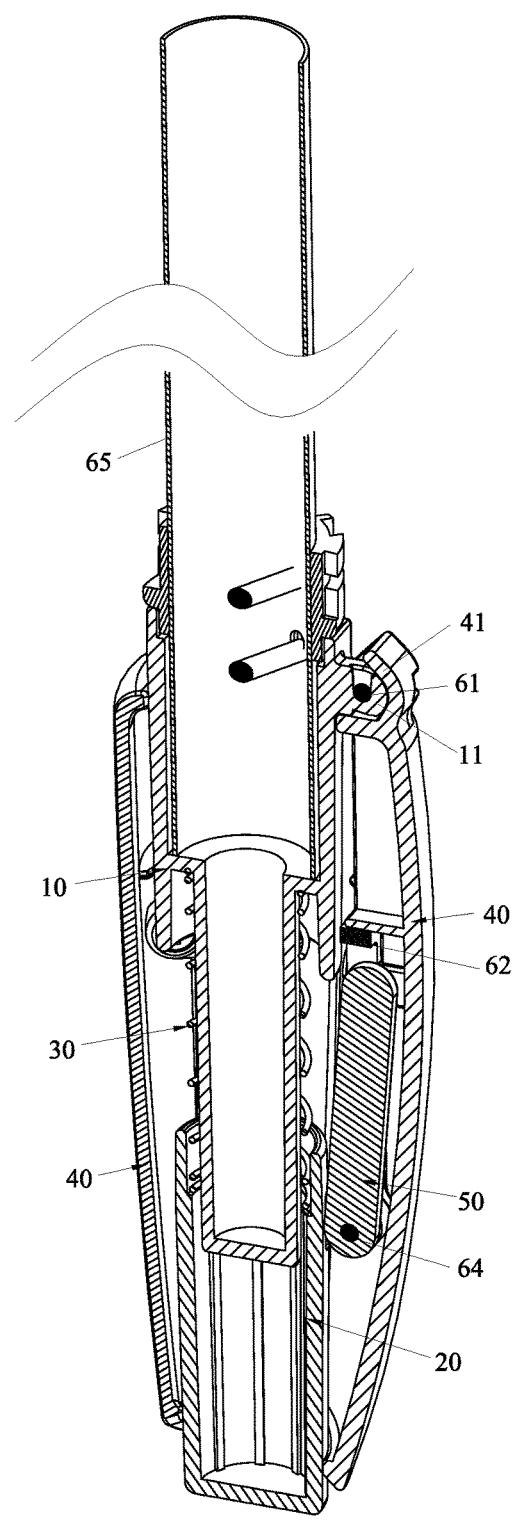
FIG. 3 is a cross-sectional view of the first preferred embodiment of the present invention.

Referring to FIGS. 1-3, a structure according to a first preferred embodiment of the present invention is shown and comprises a fixed pillar 10, a movable barrel 20, a spring 30, and at least two tip blades 40.

The movable barrel 20 is mounted to a lower end of the fixed pillar 10 in a manner of being movable up and down. The spring 30 has two ends respectively supported on the fixed pillar 10 and the movable barrel 20 such that the spring 30 biases and urges the movable barrel 20 to move downward for position returning. The at least two tip blades 40 are arranged and distributed in an outer circumference of the fixed pillar 10 and each of the tip blades 40 has an upper end that is pivotally connected or hinged to a side surface of an upper end of the fixed pillar 10. Each of the tip blades 40 is provided with a link bar 50, and each of the link bars 50 has an upper end pivotally connected or hinged to the respective tip blade 40 and each of the link bars 50 has a lower end that is pivotally connected or hinged to a side surface of an upper end of the movable barrel 20.

In the instant embodiment, the side surface of the upper end of the fixed pillar 10 comprises first hinge sections 11 projecting outward therefrom and the upper ends of the tip blades 40 are each provided with a second hinge section 41 extended therefrom. The second hinge sections 41 are pivotally connected or hinged to the first hinge sections 11 respectively by means of first pivot pins 61. The link bars 50 are each provided with a rotation axle 51 extending from the upper end thereof, and the rotation axle 51 is mounted, by means of a constraint member 62, to an inside surface of the respective tip blade 40. The constraint member 62 is fixed to the inside surface of the tip blade 40 by means of screws 63. The link bars 50 are each provided, on the lower end thereof, with a third hinge section 52, and the movable barrel 20 is provided, on the side surface of the upper end thereof, with fourth hinge sections 21, such that the fourth hinge sections 21 are each pivotally connected or hinged, by means of a second pivot pin 64, to the third hinge sections 52 respectively. The spring 30 is fit over and encompasses an outer circumferential surface of the lower end of the fixed pillar 10. Further, the number of the tip blades 40 used is three and they are uniformly distributed such that the three tip blades 40, when expanded, achieve stable and firm supporting.

In use, the upper end of the fixed pillar 10 is coupled to a top end of a central pole 65 of an umbrella. In use or in a collapsed, but not vertically placed, as shown in FIG. 1, the multiple tip blades 40 are in a closed condition such that the multiple tip blades 40 surround, cove, and house the fixed pillar 10 and the movable barrel 20 with a lower end of the movable barrel 20 projecting beyond and outside lower ends of the tip blades 40. When a user attempts to place the umbrella in a vertical and upright manner, the multiple tip blades 40 may be operated automatically. Specifically, the movable barrel 20 is acted upon by a gravitational force of the umbrella to have the movable barrel 20 move upward with respect to the fixed pillar 10 to an extreme position and during the movement of the movable barrel 20, the link bars 50 expand the tip blades 40 outward so as to have the tip blades 40 open outward with respect to each other. With the tip blades 40 expanded outwards with respect to each other, the present invention form a stable and firm support stand that stably and firmly supports the umbrella in a vertical, upright manner, on a horizontal surface. When the umbrella is picked up and removed, under the spring force of the spring 30, the movable barrel 20 is biased and forced to move downward with respect to the fixed pillar 10 such that with the operation of the link bars 50, the tip blades 40 are caused to individually collapse and close.

Figure 4:
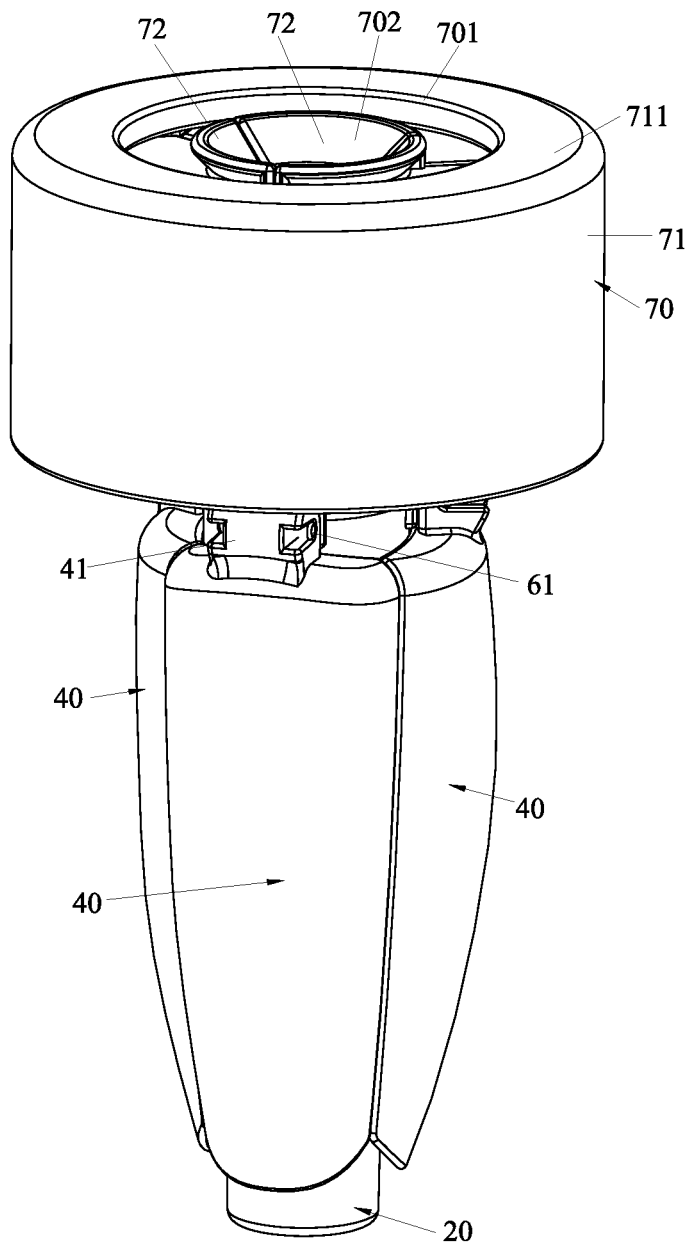
FIG. 4 is a perspective view illustrating a second preferred embodiment of the present invention in an assembled form.
Figure 5:
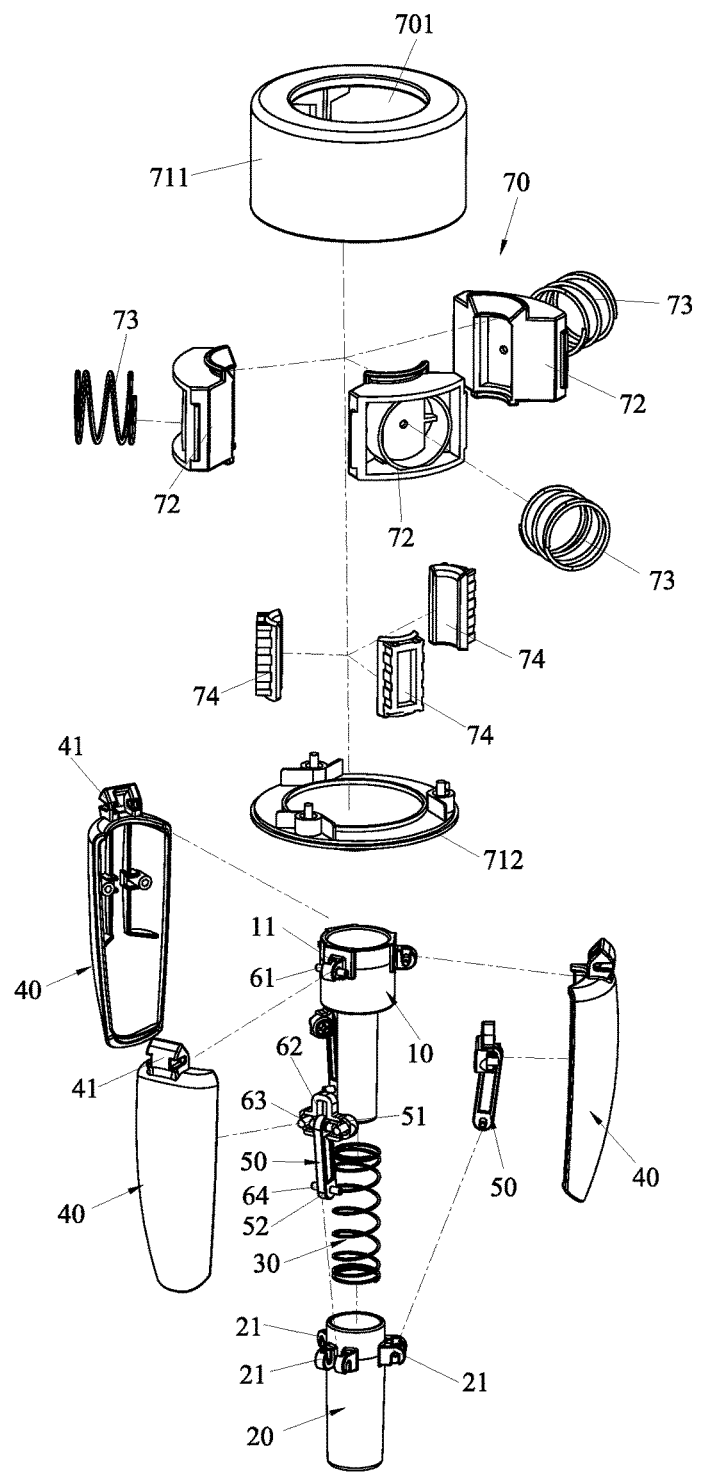
FIG. 5 is an exploded view of the second preferred embodiment of the present invention.
Figure 6:
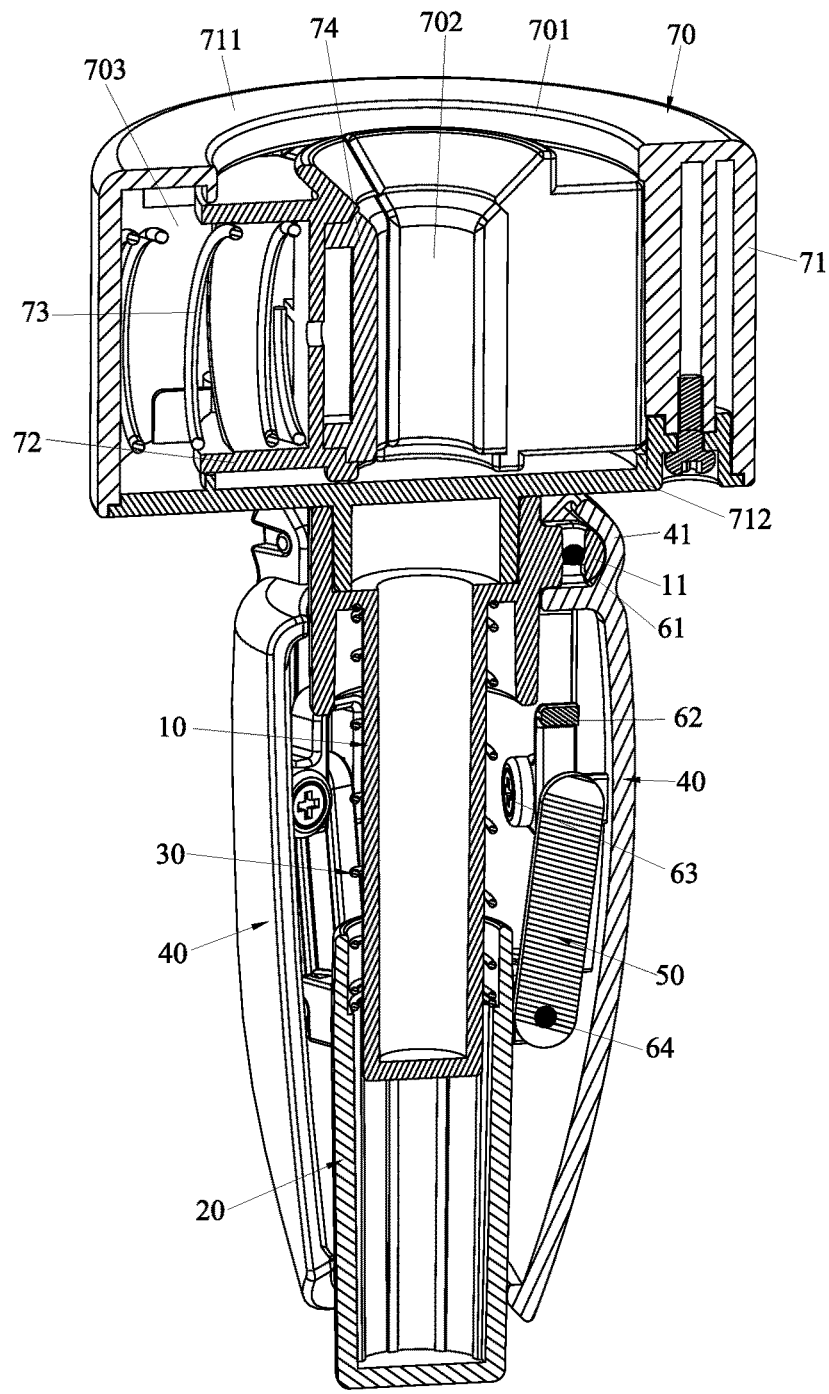
FIG. 6 is a cross-sectional view of the second preferred embodiment of the present invention.

Referring to FIGS. 4-6, a structure according to a second preferred embodiment of the present invention is illustrated. The structure of the instant embodiment is generally identical to the structure of the first preferred embodiment with differences therebetween described as follows.

In the instant embodiment, the fixed pillar 10 is provided, fixed to the upper end thereof, with a holding mechanism 70. The holding mechanism 70 comprises a housing 71, and the housing 71 has an upper end in which a through hole 701 is formed and in communication with an interior space of the housing 71. The housing 71 is provided, in the interior space thereof, with at least two holding pieces 72, such that the at least two holding pieces 72 define therebetween a holding hole 702 for clamping an umbrella tip. The holding hole 702 is in alignment with the through hole 701. Each of the holding pieces 72 is provided with an operating piece 73, and the operating piece 73 is arranged between and elastically biasing the holding piece 72 and the interior of the housing 71 with respect to each other. Each of the holding pieces 72 has an outside surface that is provided with a flexible plastic part 74 attached thereto and the flexible plastic part 74 is generally located in the holding hole 702.

Specifically, in the instant embodiment, the housing 71 comprises a top cover 711 and a bottom board 712. The bottom board 712 is attached to and covers and closes a bottom of the top cover 711. The through hole 701 is formed in a top of the top cover 711. The top cover 711 and the bottom board 712 circumferentially delimit a receiving space 703, and the holding pieces 72 and the operating pieces 73 are arranged in the receiving space 703. Further, the number of the holding pieces 72 used in three and the three holding pieces 72 collaboratively clamp the umbrella tip therebetween. Further, the operating pieces 73 may comprise springs.

In the instant embodiment, the holding mechanism 70 may be used with an umbrella tip of any type of umbrella such that in use, the umbrella tip is inserted into the through hole 701 and further gets into the holding hole 702. Assembling and disassembling can be done easily. The other parts of the instant embodiment are similar, in structure and operation, to those of the first preferred embodiment described above so that a detailed description of the operation and structure of the instant embodiment will be omitted here.

A design idea of the present invention is that the present invention is mountable to an umbrella in such a way that the tip blades can be automatically expanded and/or collapsed so that in use, with the movable barrel positioned against a horizontal surface, the tip blades may be opened automatically to make the present invention a stable and firm support stand that stably and firmly supports the umbrella in a vertical, upright condition on a horizontal surface, achieving vertical placement of the umbrella. The operation and use of the present invention is simple and easy.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An umbrella tip structure that is adapted to allow for vertical placement of an umbrella, the umbrella tip structure comprising a fixed pillar, a movable barrel, a spring, and at least two tip blades, wherein the movable barrel is mounted to a lower end of the fixed pillar in a manner of being movable up and down; the spring has two ends respectively supported on the fixed pillar and the movable barrel such that the spring biases and urges the movable barrel to move downward for position returning; the at least two tip blades are arranged and distributed in an outer circumference of the fixed pillar and each of the tip blades has an upper end that is pivotally connected to a side surface of an upper end of the fixed pillar; each of the tip blades is provided with a link bar and each of the link bars has an upper end pivotally connected to the respective tip blade and each of the link bars has a lower end that is pivotally connected to a side surface of an upper end of the movable barrel; wherein in a closed condition, the at least two tip blades cover and enclose the fixed pillar and the movable barrel with a lower end of the movable barrel projecting beyond and outside lower ends of the tip blades; and in an open condition, the movable barrel moves upward to an extreme position where the tip blades expand outwards with respect to each other.

2. The umbrella tip structure according to claim 1, wherein the side surface of the upper end of the fixed pillar comprises first hinge sections projecting outward therefrom and the upper ends of the tip blades are each provided with a second hinge section extended therefrom, the second hinge sections being pivotally connected to the first hinge sections respectively by means of first pivot pins.

3. The umbrella tip structure according to claim 1, wherein the link bars are each provided with a rotation axle extending from the upper end thereof, and the rotation axle is mounted, by means of a constraint member, to an inside surface of the respective tip blade.

4. The umbrella tip structure according to claim 3, wherein the constraint member is fixed to the inside surface of the tip blade by means of screws.

5. The umbrella tip structure according to claim 1, wherein the link bars are each provided, on the lower end thereof, with a third hinge section, and the movable barrel is provided, on the side surface of the upper end thereof, with fourth hinge sections, such that the fourth hinge sections are each pivotally connected, by means of a second pivot pin, to the third hinge sections respectively.

6. The umbrella tip structure according to claim 1, wherein the at least two tip blades comprise three tip blades distributed in a uniform manner.

7. The umbrella tip structure according to claim 1, wherein the spring is fit over and encompasses an outer circumferential surface of the lower end of the fixed pillar.

8. The umbrella tip structure according to claim 1, wherein the fixed pillar is provided with a holding mechanism fixed to the upper end thereof, the holding mechanism comprising a housing, the housing having an upper end in which a through hole is formed and in communication with an interior space of the housing, the housing being provided, in the interior space thereof, with at least two holding pieces, such that the at least two holding pieces define therebetween a holding hole for clamping an umbrella tip, the holding hole being in alignment with the through hole, each of the holding pieces being provided with an position-returning piece, the position-returning piece being arranged and positioned between the holding piece and the interior of the housing.

9. The umbrella tip structure according to claim 8, wherein each of the holding pieces has an outside surface that is provided with a flexible plastic part attached thereto and the flexible plastic part is located in the holding hole.

10. The umbrella tip structure according to claim 8, wherein the at least two holding pieces comprise three holding pieces.

* * * * *